United States Patent Office 3,090,738
Patented May 21, 1963

3,090,738
METHOD OF CURING ORGANOSILICON COMPOUNDS
Earl L. Warrick, Pittsburgh, Pa., assignor to Dow Corning Corporation, Midland, Mich., a corporation of Michigan
No Drawing. Filed Aug. 18, 1954, Ser. No. 450,793
4 Claims. (Cl. 204—158)

This invention relates to the curing of organosilicon compounds by means of electromagnetic radiation of certain wave lengths.

Previously the methods of curing organopolysiloxanes involved the application of heat and/or the use of some chemical reagent. The former method usually requires long periods of time and is not generally satisfactory on a commercial basis. Most of the presently known cures involve the combination of heat and a chemical agent. Whereas these methods have proved to be commercially satisfactory, they suffer from the disadvantage of residual curing agent remaining after the desired cure is obtained. This residual curing or vulcanizability results in deterioration of the siloxane upon subsequent heating and is reflected in high compression set values for silicone rubbers and in comparatively short craze life for silicone resins.

Another previously known method of curing siloxanes in the absence of heat is that of employing a combination of alkoxypolysilicates or hydrogen containing siloxanes and certain metallic catalysts. This method is applicable for certain uses but it suffers from the disadvantage that no control can be exercised over the cure once the catalyst has been added to the system.

It is the object of this invention to provide a novel method for curing organopolysiloxanes which does not leave residual vulcanizability in the system and which can be readily controlled. Another object is to provide a method by which siloxanes can be continuously vulcanized in a system that requires no pressure. Other objects and advantages will be apparent from the following description.

In accordance with this invention, an organosilicon compound of the formula $$R_nSiY_{\frac{4-n}{2}}$$

in which R is a monovalent hydrocarbon radical or a halogenated monovalent hydrocarbon radical, Y is an oxygen atom or a divalent hydrocarbon radical and n has an average value from 1 to 3 inclusive is cured by subjecting the organosilicon compound to electromagnetic radiation having a wave length of less than 3 A.

In the method of this invention at least a major portion of the R groups in the organosilicon compound must be aliphatic hydrocarbon radicals and preferably lower aliphatic hydrocarbon radicals containing less than 5 carbon atoms. It is necessary that a major portion of the R groups be aliphatic because aromatic hydrocarbon substituted organosilicon compounds are quite resistant to electromagnetic radiation and hence are not vulcanized thereby.

It is believed that the curing action of this invention involves the formation of free radicals on the aliphatic hydrocarbon radicals and that these free radicals subsequently cause linking of the siloxane molecules thereby advancing the molecular weight of the compounds. It is to be understood, however, that the scope of this invention is not limited to such a mechanism.

Organosilicon compounds which are operative herein are organosiloxanes of the type $$R_nSiO_{\frac{4-n}{2}}$$

where R and n are as above defined and silcarbanes of the general formula $$R_nSiR'_{\frac{4-n}{2}}$$

in which R' is a divalent hydrocarbon radical such as alkylene radicals such as ethylene, methylene, propylene and octadecylene; cycloalkylene radicals such as cyclohexylene; arylene radicals such as phenylene and biphenylene and unsaturated divalent hydrocarbon radicals such as ethynylene (—C≡C—) and vinylene (—CH=CH—).

For the purposes of this invention R can be any monovalent hydrocarbon radical such as alkyl, such as methyl, ethyl and octadecyl; alkenyl such as vinyl, allyl, and propenyl; cycloaliphatic such as cyclohexyl and cyclohexenyl; aromatic hydrocarbon radicals such as phenyl, tolyl, xylyl, and xenyl and halogenated monovalent hydrocarbon radicals such as trifluorovinyl, chlorophenyl, trifluorotolyl, chloromethyl, and chlorohexafluorocyclopentenyl.

It should be understood that the method of this invention is applicable both to homopolymers, copolymers and mixtures of the various organosilicon compounds within the scope of this invention. It should also be understood that some of the silicon atoms in the organosilicon compound may be linked by oxygen and the remainder by hydrocarbon radicals.

The extent of molecular aggregation of the organosilicon compound is not critical. Thus materials ranging all the way from thin fluids such as hexamethyldisiloxane to non-flowing solids can be cured.

Any electromagnetic radiation having a wave length of less than 3 A. can be employed in the method of this invention. Types of radiation which are suitable are gamma rays and X-rays. When X-rays are employed it is preferable that the power used to generate them be of the order of 3,000 to 7,000 watts. This gives X-radiation of greater intensity and causes vulcanization and curing in a few minutes to a few seconds.

It is also desirable that the radiation cover as wide an area as possible in order that large samples can be cured.

The method of this invention is particularly adaptable for the continuous curing of coated wire and electrical conductors.

The following examples are illustrative only and should not be construed as limiting the invention which is properly delineated in the appended claims.

Example 1

The siloxane employed in this example was a mixture of 100 parts by weight of a dimethylpolysiloxane having a molecular weight of 1,048,000 and 35 parts by weight of a fume silica. A sample of this material was subjected to the radiation from cobalt 60 for 10 hours. The radiation had a strength of $.5 \times 10^6$ roentgen equivalents physical, per hour. The resulting siloxane elastomer had a Shore of 27, tensile strength of 1180 p.s.i., elongation at break 750% and a molecular weight between cross links of 8,470. The molecular weight between cross links was determined by swelling measurements on the vulcanized elastomer.

Example 2

The siloxane composition of Example 1 was subjected to X-rays having a wave length of from .4 to 1.54 A. This radiation was derived from a 700 watt source. The vulcanized samples were subjected to swelling measurements and the results were as follows:

| Time in hours: | Molecular weight between cross links |
|---|---|
| ¼ | 35,140 |
| 1 | 19,200 |
| 5 | 4,650 |

These measurements show adequate vulcanization of the sample in from 1 to 5 hours.

Example 3

The effect of increasing the power of the radiation source is shown in the following table. In each case the siloxane composition of Example 1 was employed.

| Power in watts | Time in minutes | Molecular weight between cross links |
|---|---|---|
| 700 | 15 | 35,140 |
| 1,000 | 2 | 28,400 |
| 2,500 | 1 | 25,100 |

Example 4

The effect of using varying wave lengths is shown in this example. In this case the siloxane composition of Example 1 was subjected to X-rays of varying wave lengths for 5 hours each and the percent of cross links established was determined by swelling.

| Wave length in A.: | Percent of siloxane units linked in 5 hours' time |
|---|---|
| .711 | .357 |
| 1.542 | .253 |
| 2.29 | .09 |

Example 5

Curing of the organosilicon compound is obtained when a dimethylsilmethylene fluid of the formula $$(Me_2SiCH_2-)_x$$

is subjected to X-rays having a wave length of .711 A. for 5 hours.

Equivalent results are obtained when materials having the following unit formulae are employed in the above method:

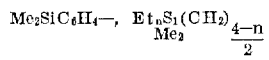

where $n$ has an average value of 1.5, $Me_3Si(OSi)_xOSiMe_3$, $Me(C_2F_3)SiO$, a copolymer of 10 mol percent diphenylsiloxane and 90 mol percent dimethylsiloxane and $C_{18}H_{37}(C_2H_3)SiO$.

That which is claimed is:

1. A method of curing organosilicon compounds which comprises subjecting an organosilicon compound of the formula

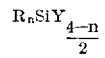

in which R is selected from the group consisting of monovalent hydrocarbon radicals and halogenated monovalent hydrocarbon radicals, Y is selected from the group consisting of oxygen atoms and divalent hydrocarbon radicals, and $n$ has an average value of from 1 to 3 inclusive, at least a major portion of the R groups in said compound being aliphatic hydrocarbon radicals, to electromagnetic radiation of less than 3 A. in wave length until the desired cure is obtained.

2. The method in accordance with claim 1 wherein the organosilicon compound is a methylsiloxane.

3. The method in accordance with claim 1 wherein the organosilicon compound is a methylsilcarbane.

4. A process for vulcanizing a raw elastomeric silicone composition which contains no chemical vulcanizing agent which comprises irradiating said composition with gamma radiation of a dosage of at least about $5 \times 10^6$ r. to effect vulcanization.

References Cited in the file of this patent

UNITED STATES PATENTS

| | | |
|---|---|---|
| 1,906,402 | Newton | May 2, 1933 |
| 2,668,133 | Brophy et al. | Feb. 2, 1954 |
| 2,763,609 | Lewis et al. | Sept. 18, 1956 |

OTHER REFERENCES

The Physical Review, Second Series, vol. 68, Nos. 9 and 10, Nov. 1, and 15, 1945, pp. 193–197.

Davidson et al., Journal of Applied Physics, vol. 19, May 1948, pp. 427–33.

Lawton et al., Nature, vol. 172, July 11, 1953, pp. 76–77.

"Symposium on Utilization of Radiation From Fission Products," Nov. 20, 1953, Harwell, A.E.R.E. c/R 1231, pp. 113, 114, 118.

Ryan, "Modern Plastics," vol. 31, No. 8, April 1954, pp. 148–158.

Chemical and Engineering News, vol. 33, No. 14, Apr. 4, 1955, pp. 1424 and 1425.

UNITED STATES PATENT OFFICE
CERTIFICATE OF CORRECTION

Patent No. 3,090,738                         May 21, 1963

Earl L. Warrick

It is hereby certified that error appears in the above numbered patent requiring correction and that the said Letters Patent should read as corrected below.

Column 3, lines 40 to 42, the formula should appear as shown below instead of as in the patent:

$$Me_2SiC_6H_4\text{-, } Et_nSi(CH_2)_{\frac{4-n}{2}}$$

same column 3, line 44, the formula should appear as shown below instead of as in the patent:

$$\overset{Me_2}{Me_3Si(OSi)_xOSiMe_3}$$

Signed and sealed this 12th day of May 1964.

(SEAL)
Attest:

ERNEST W. SWIDER                                   EDWARD J. BRENNER
Attesting Officer                                  Commissioner of Patents